(No Model.) 2 Sheets—Sheet 1.
E. F. CHANCE.
MACHINERY FOR ROLLING GLASS.
No. 488,114. Patented Dec. 13, 1892.
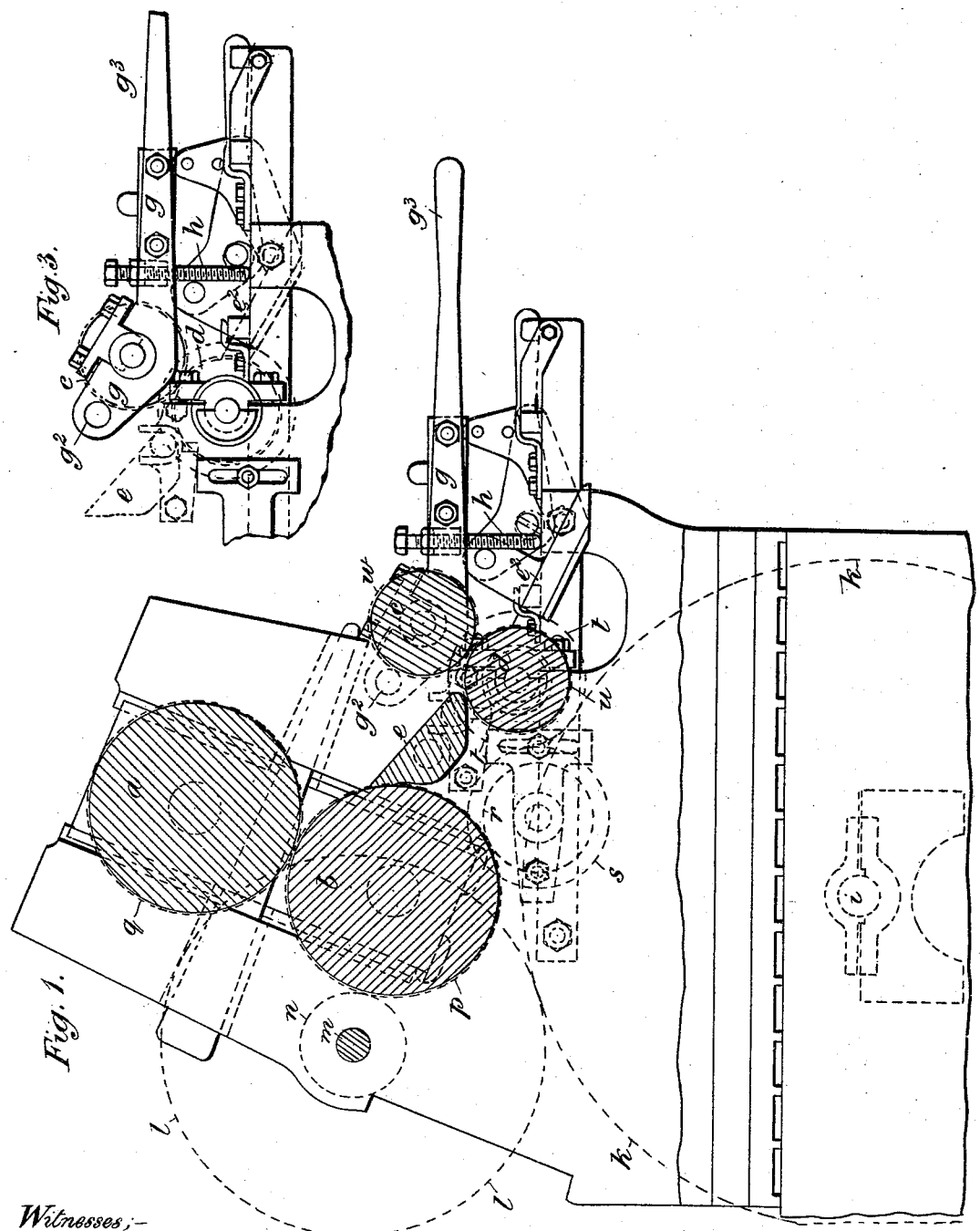
Witnesses:
Richard Skerrett
Arthur John Powell
Inventor:
Edward Ferguson Chance

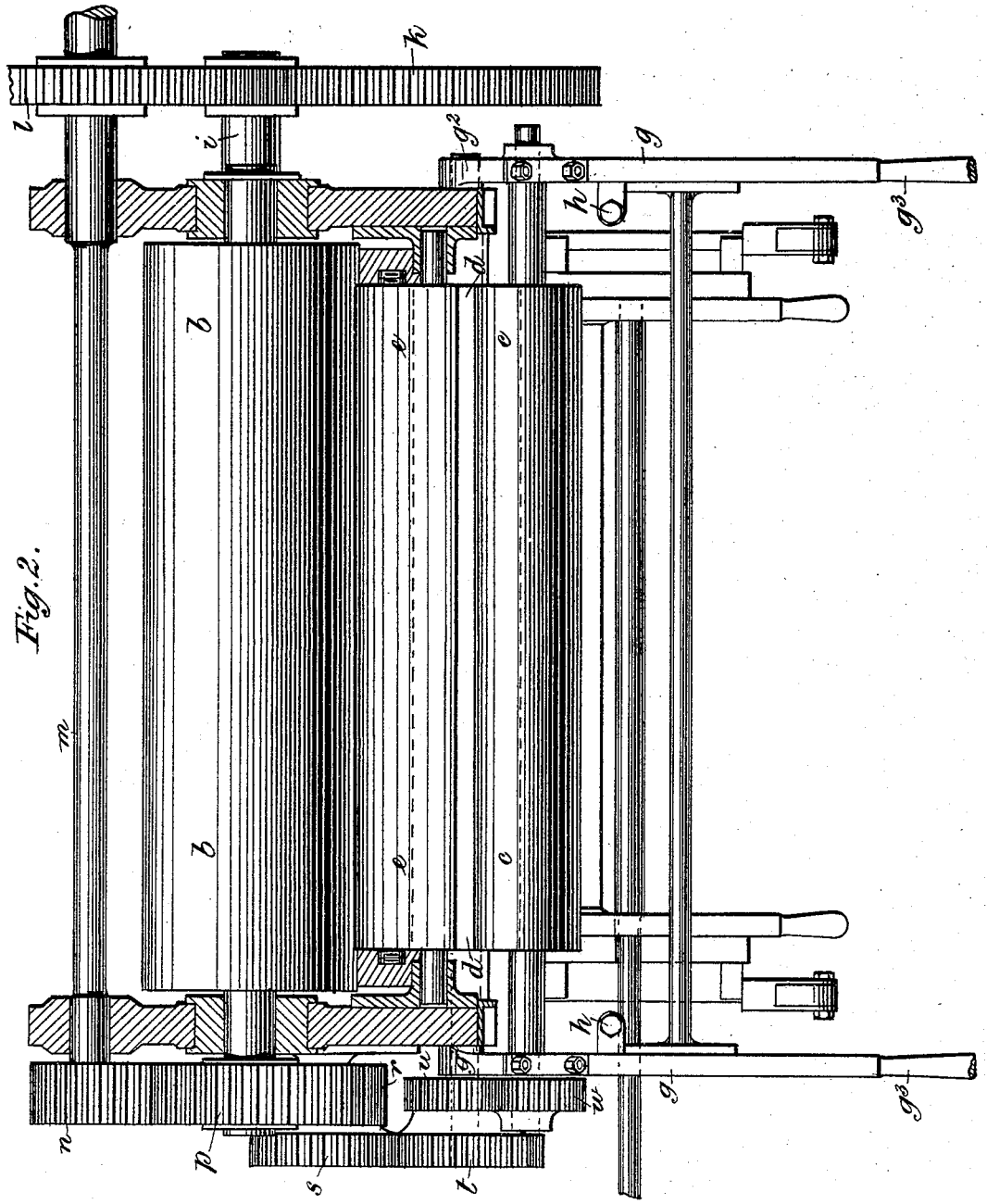

UNITED STATES PATENT OFFICE.

EDWARD FERGUSON CHANCE, OF WEST SMETHWICK, ENGLAND, ASSIGNOR TO CHANCE BROTHERS & CO., LIMITED, OF SAME PLACE.

MACHINERY FOR ROLLING GLASS.

SPECIFICATION forming part of Letters Patent No. 488,114, dated December 13, 1892.

Application filed June 14, 1892. Serial No. 436,712. (No model.) Patented in England January 15, 1890, No. 785.

*To all whom it may concern:*

Be it known that I, EDWARD FERGUSON CHANCE, a subject of the Queen of Great Britain, residing at West Smethwick, England, have invented certain new and useful Improvements in Machinery for Rolling Glass, (for which I have obtained Letters Patent of Great Britain, No. 785, dated January 15, 1890;) and I do hereby declare that the following is a full, clear, and exact description of the invention, which will enable others skilled in the art to which it appertains to make and use the same.

My invention consists of improvements in or additions to machinery for rolling glass, for which Letters Patent were granted in the United States to Frederick Mason and John Conqueror, dated September 22, 1885, No. 326,764.

The invention patented by Messrs. Mason and Conqueror consists, essentially, of a pair of rolls between which molten glass running down an inclined plate passes and is thereby rolled into a sheet, which sheet is received on another inclined plate, from which it passes to the annealing-kiln.

My invention consists of the combination, with the said patented invention, of an additional pair of rolls by which the sheet of glass formed by the first pair of rolls is further operated upon and improved, and, where desirable, impressed with a pattern on one or both sides by one or both of the said additional pair of rolls.

In carrying my invention into effect I employ a pair of rolls, preferably of smaller diameter than the first pair of rolls by which the sheet of glass is originally formed. I will call the original pair of rolls by which the sheet of glass is formed the "primary rolls" and I will call the second pair of rolls the "secondary rolls." The axes of the secondary rolls are horizontal, but are not situated vertically one above the other, the plane in which the said axes are situated being approximately at right angles to the plane of the inclined plate down which the sheet of glass from the primary rolls descends. In this arrangement the second inclined plate, which receives the sheet of glass after leaving the primary rolls, is divided into two parts, the secondary rolls intervening. The said secondary rolls are geared together so as to rotate in opposite directions, preferably, with the same speed. I give the said secondary rolls by preference a slight "lead"—that is, I make them rotate with a surface velocity slightly greater than that of the primary rolls. By the said lead the said secondary rolls are made to remove any "buckling" or irregularity of figure which the sheet of glass still plastic may have acquired after leaving the primary rolls. Such lead must be increased or diminished with any substantial increase or diminution of the distance between the two pairs of rolls. If it is desired to impress any design on one or both sides of the sheet of glass, it may be done by one or both of the secondary rolls. In order to be able to exercise complete control over the action of the secondary rolls, I support the bearings of one or both of them, preferably those of the upper roll, upon a lever. By the application of a weight or by pressure otherwise applied I can determine with the greatest nicety the extent to which the secondary rolls operate on the sheet of glass formed by the primary rolls. The maximum effect which it is desired the secondary rolls shall have on the sheet of glass may be determined by an adjustable screw stop or stops, which can be adjusted so as to limit the distance to which the lever referred to can descend with the greatest nicety. In impressing a design I prefer to raise the upper secondary roll while the first end of the sheet of glass (which is too much chilled to properly receive the impression) is passing through, in order to avoid the wear upon the imprinted roll. The sheet of glass after leaving the secondary rolls is conveyed to the annealing-kiln in the usual way.

I will now proceed to describe with reference to the accompanying drawings the manner in which my invention is to be performed.

Figure 1 represents in vertical section, partly in side elevation, and Fig. 2 in plan, partly in horizontal section, machinery for rolling glass containing the improvements constituting my invention. The top roll of the primary pair of rolls is removed in Fig. 2. Fig. 3 represents a side elevation of a portion of the machinery.

In Figs. 1 and 2, the inclined plate down which the molten glass runs to the primary pair of rolls is omitted.

The same letters of reference indicate the same parts in the several figures of the drawings.

$a\,b$ are the primary rolls by which the sheet of glass is formed, and $c\,d$ are the secondary rolls by which the sheet of glass formed by the primary rolls is further operated upon and improved and, if required, impressed with a pattern on one or both sides of the sheet. $e$ is the inclined plate, which receives the sheet of glass from the primary rolls and conducts it to the secondary rolls, and $e^2$ is the inclined plate which receives the sheet of glass from the secondary rolls. The axes of the secondary rolls are horizontal; but it will be seen that they are not situated vertically one above the other; but the upper roll is somewhat in advance of the lower roll, the plane of the axes of the secondary rolls being situated approximately at right angles to the plane of the inclined plate $e$, down which the sheet of glass from the primary rolls descends. It will also be seen by an examination of Fig. 1 that the secondary rolls $c\,d$ are situated between the two inclined plates $e$ and $e^2$. The secondary rolls $c\,d$ may either be plain rolls or a pattern or design may be engraved or otherwise made upon the surface of one or both rolls. In the latter case the sheet of glass operated upon by the secondary rolls will be impressed on one or both sides of it with the pattern or design on one or both rolls. The said secondary rolls are geared together and driven in the manner hereinafter described from the primary rolls, the secondary pair of rolls rotating in opposite directions, preferably, with the same speed. It is preferred that the secondary rolls $c\,d$ shall have a slight lead or be made to rotate with a surface velocity slightly greater than that of the primary rolls for the purpose of removing any buckling or irregularity of figure which the sheet of glass, still plastic, may have acquired after leaving the primary rolls.

The sheet of glass first operated upon by the primary pair of rolls $a\,b$ is received on the upper inclined plate $e$, down which it passes to the secondary pair of rolls $c\,d$ and further operated upon and, if required, impressed by the said rolls if the roll or rolls has or have been provided with a pattern or design, as before described. The plain or ornamented sheet of glass after leaving the secondary rolls is received on the lower inclined plate $e^2$ and from thence conveyed to the annealing-kiln. The bearings of the upper roll $c$ of the secondary pair of rolls $c\,d$ are supported in the levers $g\,g$, turning on the centers $g^2\,g^2$ and operated by the handles $g^3\,g^3$. The distance to which the upper roll $c$ can descend and approach the lower roll $d$ is regulated by the adjustable screw-stops $h\,h$, carried by the said levers $g\,g$, bearing on the frame of the machine. (See Figs. 1 and 3.) The said levers $g\,g$ may be pressed down by weights or springs, so that the extent to which the secondary rolls operate on the sheet of glass formed by the primary rolls can be determined, the maximum effect of the secondary rolls on the sheet of glass being determined by the adjustable stops $h\,h$. The use of the supporting-levers $g\,g$ of the upper roll $c$ also permits the said upper roll of the secondary pair of rolls being raised from the lower roll when required. This is desirable when impressing a design on the glass, as the first end of the sheet of glass is too much chilled to properly receive the impression in passing through the rolls, and hence injurious wear upon the impressing-roll is avoided.

The primary rolls and secondary rolls are driven by the following gearing: $m$ is the driving-shaft carrying the pinion $n$, which gears with the wheel $p$ on the axis of the lower primary roll $b$. The pinion $p$ gears with a similar pinion $q$ (shown in dotted lines in Fig. 1) on the axis of the upper roll $a$. The secondary rolls $c\,d$ are driven from the lower roll $b$ of the primary rolls by the following gearing: Between the lower rolls $b$ and $d$ of the primary and secondary pairs is an axis carrying an intermediate toothed wheel $r$, which gears with the pinion $p$ on the lower roll $b$. The axis of the intermediate toothed wheel $r$ carries a second toothed wheel $s$, (see Fig. 1,) which gears with the toothed wheel $t$ on the axis of the lower roll $d$ of the secondary pair of rolls, and the two rolls $c\,d$ are geared together by the pinions $u$ and $w$.

Having now particularly described and ascertained the nature of my invention and the manner in which the same is to be performed, I declare that I claim—

1. In a glass-rolling machine, the combination, with a pair of cylindrical primary pressing-rolls $a$ and $b$, of the cylindrical secondary pressing-rolls $c$ and $d$, the inclined plate $e$, interposed between the primary and the secondary pressing-rolls, and the inclined plate $e^2$, located in rear of the secondary pressing-rolls and serving to receive the sheet of glass therefrom, substantially as described.

2. In a glass-rolling machine, the combination, with a pair of cylindrical primary pressing-rolls $a$ and $b$ and the inclined plate $e$, of the cylindrical secondary pressing-rolls $c$ and $d$, having their shafts geared to the primary rolls and one arranged in advance of the other, so that the plane of the axes of the secondary rolls is situated approximately at right angles to the plane of the said inclined plate, and the inclined plate $e^2$, arranged in rear of the secondary pressing-rolls to receive the sheet of glass therefrom, substantially as described.

EDWARD FERGUSON CHANCE. [L. S.]

Witnesses:
 RICHARD SKERRETT,
 ARTHUR J. POWELL.